(12) United States Patent
Ito

(10) Patent No.: US 7,661,647 B2
(45) Date of Patent: Feb. 16, 2010

(54) VEHICLE SEAT SLIDE DEVICE

(75) Inventor: Sadao Ito, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 136 days.

(21) Appl. No.: 11/454,872

(22) Filed: Jun. 19, 2006

(65) Prior Publication Data

US 2006/0289717 A1    Dec. 28, 2006

(30) Foreign Application Priority Data

Jun. 27, 2005    (JP) ............................. 2005-186192

(51) Int. Cl.
*F16M 13/00* (2006.01)
(52) U.S. Cl. .................. 248/429; 248/430; 297/330
(58) Field of Classification Search ............... 248/429; 297/344.1; 296/65.14, 65.13, 65.15
See application file for complete search history.

(56) References Cited

U.S. PATENT DOCUMENTS

| | | | |
|---|---|---|---|
| 5,454,326 A | 10/1995 | Ito | |
| 5,454,541 A | 10/1995 | Ito | |
| 6,220,642 B1 * | 4/2001 | Ito et al. | 296/65.14 |
| 6,260,922 B1 * | 7/2001 | Frohnhaus et al. | 297/330 |
| 6,688,667 B2 * | 2/2004 | Nishimoto et al. | 296/65.15 |
| 6,971,620 B2 * | 12/2005 | Moradell et al. | 248/422 |
| 7,073,764 B2 * | 7/2006 | Matsushiro | 248/424 |
| 7,198,243 B2 * | 4/2007 | Hofschulte et al. | 248/429 |
| 2005/0035261 A1 * | 2/2005 | Goodbred | 248/429 |

FOREIGN PATENT DOCUMENTS

| | | |
|---|---|---|
| DE | 39 27 379 C1 | 10/1990 |
| JP | 3 114 326 B2 | 9/2000 |

OTHER PUBLICATIONS

Extended European Search Report dated May 7, 2007 issued in a European patent application corresponding to this US application.

\* cited by examiner

*Primary Examiner*—Amy J Sterling
(74) *Attorney, Agent, or Firm*—Buchanan Ingersoll & Rooney PC

(57) ABSTRACT

A vehicle seat slide device includes a lower rail formed so as to include a first opening portion opening upward and fixed at a vehicle floor, an upper rail supported by the lower rail through the first opening portion so as to be slidable and supporting a vehicle seat, a screw member provided between the upper rail and the lower rail so as to extend in a sliding direction thereof, a nut member fixed at the lower rail and threadedly engaged with the screw member, a covering member formed so as to include an upper wall covering the first opening portion and fixed at the lower rail, a driving mechanism generating a driving force by which the screw member is rotated relative to the nut member so that the upper rail slides relative to the lower rail and the screw member positioned below the upper wall of the covering member.

20 Claims, 5 Drawing Sheets

VEHICLE SEAT SLIDE DEVICE

CROSS REFERENCE TO RELATED APPLICATIONS

This application is based on and claims priority under 35 U.S.C. § 119 to Japanese Patent Application 2005-186192, filed on Jun. 27, 2005, the entire content of which is incorporated herein by reference.

FIELD OF THE INVENTION

The present invention relates to a vehicle seat slide device for sliding a vehicle seat relative to a vehicle floor by use of a driving force.

BACKGROUND

A known seat slide device disclosed in JP3114326B has a lower rail, an upper rail, a screw member, a nut member and a covering member. Specifically, the lower rail fixed at a vehicle floor includes an opening portion opening in an upward direction. The upper rail, to which a vehicle seat is maintained, is supported by the lower rail through the opening portion so as to be slidable relative to the lower rail. The screw member is provided between the upper rail and the lower rail so as to extend in a sliding direction of the upper rail. The nut member is fixed to the lower rail and threadedly engaged with the screw member. The covering member fixed at the lower rail includes an upper wall by which the opening portion of the lower rail is covered.

A driving mechanism is connected to the screw member, and the screw member is rotated by a driving force generated at the driving mechanism. In this configuration, the known seat slide device make the upper rail slide relative to the lower rail by rotating the screw member relative to the nut member by use of the driving force generated at the driving mechanism.

According to the known seat slide device, the screw member is positioned above the upper wall of the covering member. In this configuration, because the screw member is positioned between the upper wall of the covering member and an upper wall of the upper rail, it has been considered difficult to set the distance between the upper wall of the upper rail to the upper wall of the covering member to a small value, in other words to set the height of the upper rail to a small value.

A need thus exists to provide a seat slide device in which a height of the upper rail is set to a small value.

SUMMARY OF THE INVENTION

According to an aspect of the present invention, a vehicle seat slide device includes a lower rail formed so as to include a first opening portion opening upward and fixed at a vehicle floor, an upper rail supported by the lower rail through the first opening portion of the lower rail so as to be slidable and supporting a vehicle seat, a screw member provided between the upper rail and the lower rail so as to extend in a sliding direction of the upper rail, a nut member fixed at the lower rail and threadedly engaged with the screw member, a covering member formed so as to include an upper wall covering the first opening portion and fixed at the lower rail, a driving mechanism generating a driving force by which the screw member is rotated relative to the nut member so that the upper rail slides relative to the lower rail and the screw member positioned below the upper wall of the covering member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments related to the present invention will be explained in accordance with the attached drawings.

Figure 1:
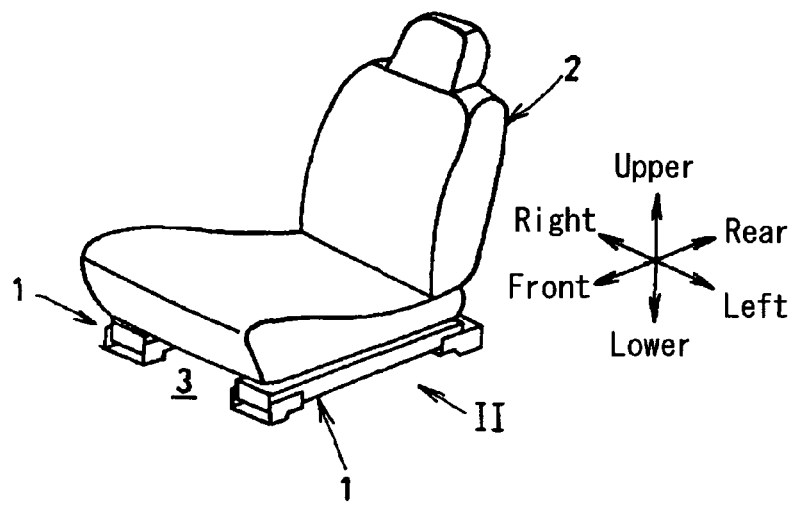
FIG. 1 illustrates an oblique view of a seat 2 to which a seat slide device 1 according to the present invention is applied.

FIG. 1 illustrates an oblique view of a seat 2 to which a seat slide device 1 (e.g., serving as a vehicle seat device) related to the present invention is applied. Such seat slide device is applied to, for example, a seat assembled to an automobile. The seat 2 is mounted on a floor 3, which comprises a part of a vehicle body.

The seat slide device 1 is provided between the seat 2 and the floor 3 and used for sliding the seat 2 relative to the floor 3. In this embodiment, two seat slide devices 1 are attached underneath the seat 2, specifically, one seat slide device 1 is attached at the right edge of the seat 2, and the other seat slide device 1 is attached at the left edge of the seat 2.

Figure 2:
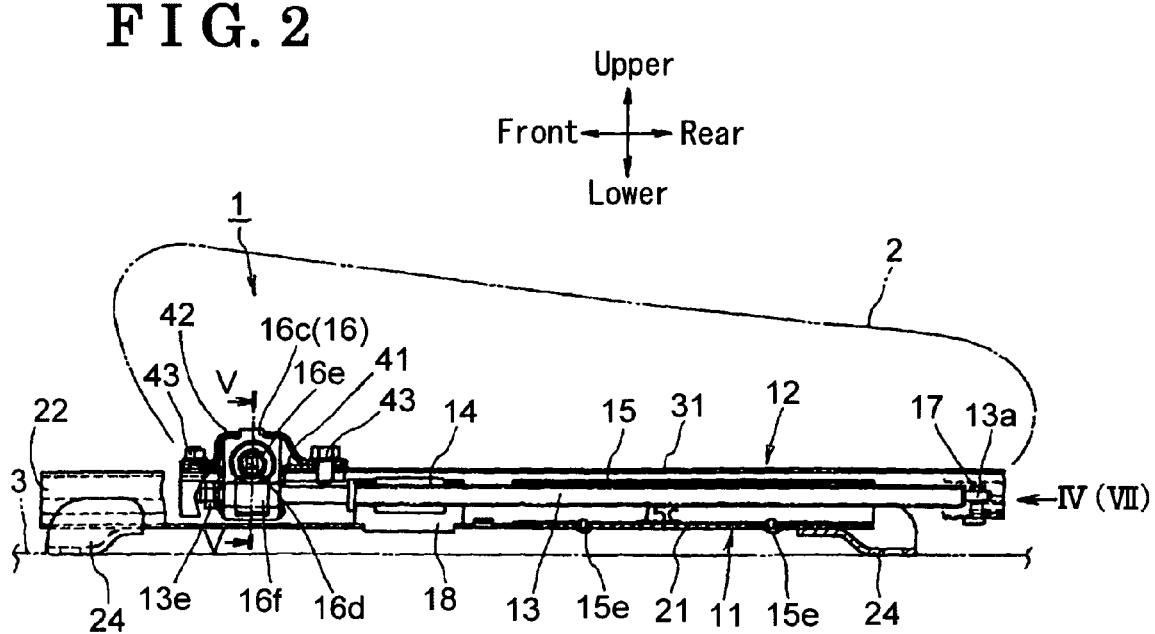
FIG. 2 illustrates a partial cross section of the seat slide device 1 seen in a II direction in FIG. 1.
Figure 3:
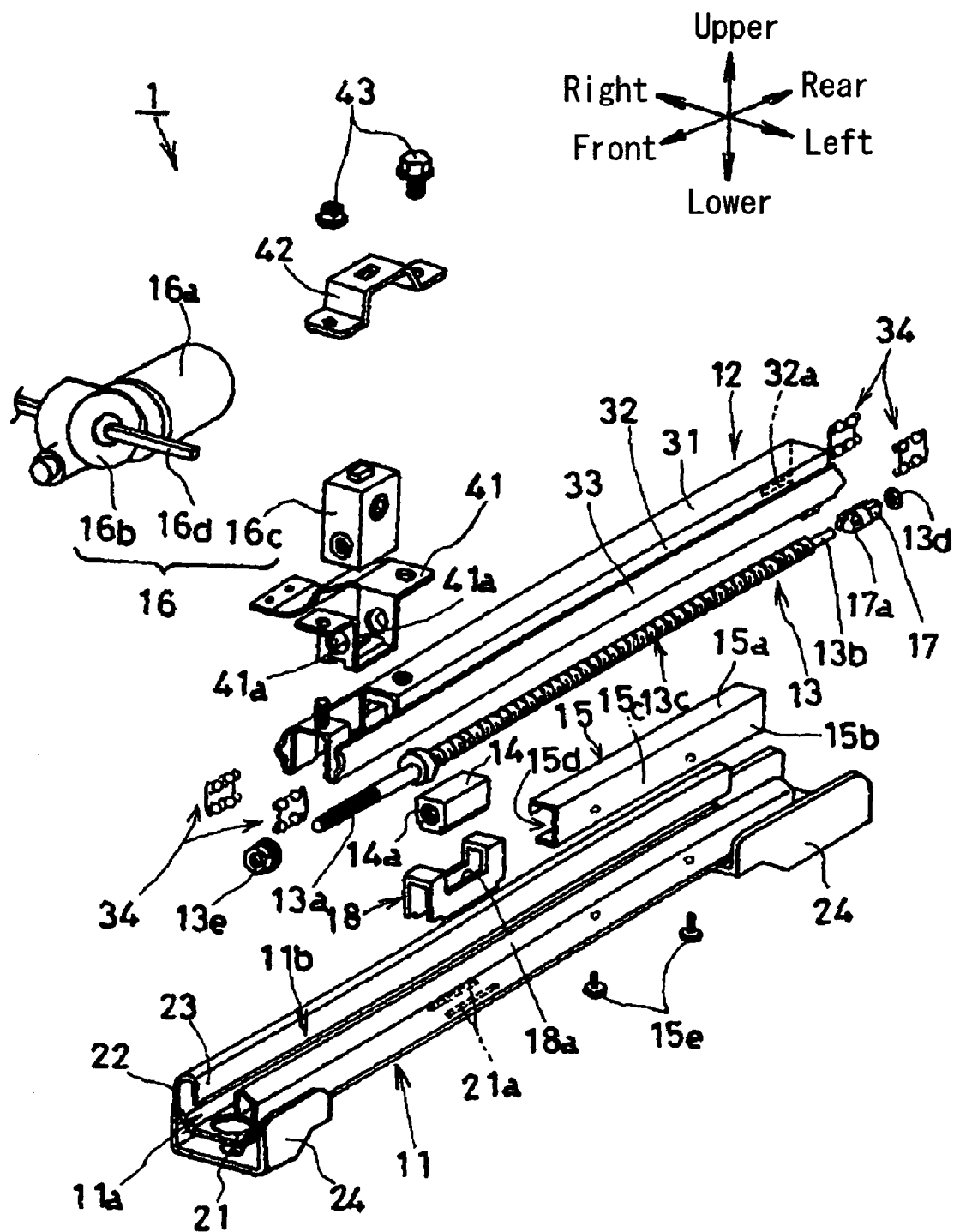
FIG. 3 illustrates an exploded perspective view of the seat slide device shown in FIG. 1.
Figure 4:
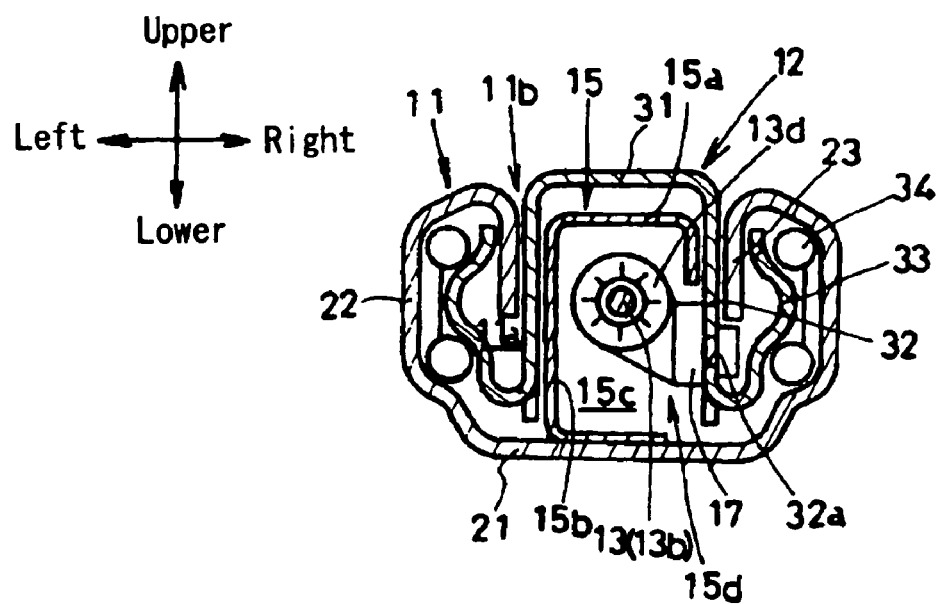
FIG. 4 illustrates a diagram indicating the seat slide device seen in IV direction.
Figure 5:
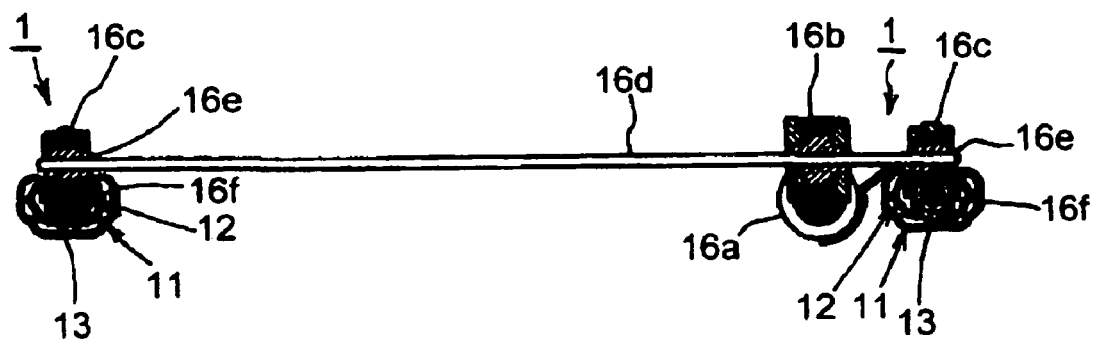
FIG. 5 illustrates a cross section of the seat side device along a V-V line in FIG. 2.

FIG. 2 illustrates a partial cross section of the seat slide device 1 seen in a direction indicated by II in FIG. 1, FIG. 3 illustrates an exploded perspective view of the seat slide device 1, FIG. 4 illustrates a diagram indicating the seat slide device 1 seen in a direction indicated by IV in FIG. 2, and FIG. 5 illustrates a cross section of the seat side device 1 along a V-V line illustrated in FIG. 2. In FIG. 2 through FIG. 4, only the seat slide device 1 attached at one side of the seat 2 (the left side in FIG. 1) is illustrated. The seat slide device 1 attached at the other side of the seat 2 has the same configuration.

The seat slide device 1 includes a lower rail 11, an upper rail 12, a screw member 13, a nut member 14, a covering member 15 and a driving mechanism 16.

The lower rail 11 is formed in a long shape so as to extend in a front-rear direction of the vehicle. Specifically, the lower rail 11 has a U-shaped cross section that is comprised of a bottom wall 21 and a pair of opposed side walls 22. One side wall 22 extends upward from one end of the bottom wall 21, and the other side wall 22 extends upward from the other end of the bottom wall 21, and then each of the side walls 22 bends inward so as to form a flange wall 23.

The lower rail 11 further includes an inner space 11a and an opening portion 11b. Specifically, the inner space 11a is formed so as to be enclosed by the bottom wall 21 and the side walls 22, and extending in a front-rear direction of the vehicle. The opening portion 11b (first opening portion) is formed at the upper portion of the inner space 11a so as to open the inner space 11a upward.

In this embodiment, two brackets 24 are attached at the lower rail 11. One bracket 24 is fixed at a front end of the lower rail 11 by means of welding. In the same way, and the other bracket 24 is fixed at a rear end of the lower rail 11 by means of welding. The lower rail 11 is fixed on the floor 3 by means of the brackets 24. The lower rail 11 may be directly fixed on the floor 3 without the brackets 24 in a manner where each of the front and rear ends of the lower rail 11 is fixed to the floor 3 by means of a fastening member such as a bolt.

The upper rail 12 is formed in a long shape so as to extend in a front-rear direction of the vehicle. Specifically, the upper rail 12 has a reversed U-shaped cross section that is comprised of an upper wall 31 and a pair of opposed side walls 32. One side wall 32 extends downward from one end of the upper wall 31, and the other side wall 32 extends downward from the other end of the upper wall 31, and then each of the side walls 32 bends outward so as to form a flange wall 33. The upper rail 12 is fixed to the seat 2 by means of a metal plate such as a bracket (not shown) in order to maintain the seat 2.

As shown in FIG. 4, the upper rail 12 is engaged with the lower rail 11 in a manner where each flange wall 33 of the upper rail 12 is inserted within the inner space 11a of the lower rail 11 so as to engage with each flange wall 23 of the lower rail 11 through sliding members 34. Thus, the upper rail 12 is supported by the lower rail 11 so as to be slidable in a front-rear direction of the vehicle within the inner space 11a of the lower rail 11. In this configuration, the seat 2 supported by the upper rail 12 slides in a front-rear direction of the vehicle relative to the floor 3 at which the lower rail 11 is fixed.

The screw member 13 is made of a metal material and formed in a bar shape. Specifically, the screw member 13 includes a serrated portion 13a, a shaft portion 13b and a screw portion 13c. The screw member 13 is provided between the lower rail 11 and the upper rail 12 in a manner where it extends in a front-rear direction of the vehicle (in a sliding direction of the upper rail 12). Specifically, a serrated portion 13a is formed on the front end of the screw member 13. The screw member 13 is connected to the driving mechanism 16, which will be described later, through the serrated portion 13a. A shaft portion 13b is formed on the rear end of the screw member 13. The shaft portion 13b of the screw member 13 is supported by a bearing 17 (supporting member) so as to be rotatable.

The bearing 17 is maintained by the upper rail 12 in a manner where the bearing 17 fits into a groove 32a formed on the side wall 32 (vertical wall portion) of the upper rail 12. A supporting hole 17a is formed at the bearing 17 so as to extend in a front-rear direction of the vehicle, and the shaft portion 13b of the screw member 13 is penetrated into the supporting hole 17a. Such shaft portion 13b of the screw member 13 that penetrates through the supporting hole 17a engages with the bearing 17 at the rear end portion thereof by means of a snap 13d. Thus, the screw member 13 is supported at the shaft portion 13b by the bearing 17 so as to be rotatable. The screw portion 13c (male screw) is formed at the screw member 13 so as to extend between the serrated portion 13a and the screw portion 13c.

The nut member 14 is made of, for example, a resin material and formed in a box shape. Specifically, a screw portion 14a (female screw) is formed at the nut member 14, and the screw portion 14a threadedly engages with the screw portion 13c of the screw member 13. The nut member 14 is fixed at the lower rail 11 by means of a housing 18. The housing 18 is penetrated into the inner space 11a of the lower rail 11 and fixed at the bottom wall 21 of the lower rail 11. The housing 18 is made of a metal material so as to have a reversed U-shaped cross section. A notch portion 18a is formed at the housing 18. In this configuration, the nut member 14 is supported by the housing 18 in a manner where the nut member 14 is fitted into the notch portion 18a of the housing 18. The housing 18 is fixed to the bottom wall 21 of the lower rail 21 in a manner where lower end portions of the housing 18 are fitted to through holes 21a formed on the bottom wall 21 of the lower rail 11.

The covering member 15 is inserted into the inner space 11a of the lower rail 11 and fixed at the bottom wall 21 of the lower rail 11. The covering member 15 is formed so as to have a C-shaped cross section and extend in a front-rear direction of the vehicle. Specifically, the covering member 15 is inserted into the inner space 11a of the lower rail in a manner where the position of a rear end of the covering member 15 is identical with the position of the rear end of the lower rail 11. More specifically, the covering member 15 is made of, for example, a metal material and formed so as to include an upper wall 15a and a side wall 15b. The upper wall 15a covers the opening portion 11b of the lower rail 11, and the covering member 15 is fixed to the lower rail 11 in a manner where the side wall 15b is fixed at the bottom wall 21 of the lower rail 11 by means of screws 15e.

The upper wall 15a and the side wall 15b are formed in a manner where the upper wall 15a continues from the side wall 15b. Furthermore, a space 15c is formed at the covering member 15 so as to be enclosed by the upper wall 15a and the side wall 15b, and the screw member 13 is provided within the space 15c. The screw member 13 is provided below the upper wall 15a of the covering member 15 as shown in FIG. 4. In this configuration, because the upper wall 31 of the upper rail 12 is positioned close to the upper wall 15a of the covering member 15, the distance between the upper wall 15a of the covering member 15 and the upper wall 31 of the upper rail 12 can be set at a smaller value. In other words, the height of the upper rail 12 can be set to a smaller value. Further, an opening portion 15d (second opening portion) is formed at the covering member 15. The opening portion 15d opens from the space 15c in a lateral direction of the vehicle seat (rightward in FIG. 3). In other words, the opening portion 15d opens so as to face the side wall 32 of the upper rail 12 at which the bearing 17 is supported.

The driving mechanism 16 is comprised of a motor 16a, a decelerating portion 16b and a gear device 16c. The motor 16a is connected to a power supply unit, which is not shown. In this configuration, when a power is supplied by the power supply unit to the motor 16a, the motor 16a generates a driving force, and the driving force is transmitted to the decelerating portion 16b. The decelerating portion 16b employs a known mechanism having a worm and a worm wheel. The decelerating portion 16b enhances the driving force generated by the motor 16a, and such enhanced driving force is outputted in order to rotate a transmitting shaft 16d. The gear device 16c is fixed at the front portion of the upper rail 12 by means of the bracket 41, the bracket 42 and the fastening member 43. The gear device 16c includes an input gear 16e and an output gear 16f. The input gear 16e is connected to the transmitting shaft 16d of the decelerating portion 16b. As shown in FIG. 5, the transmitting shaft 16d is also connected to the other side of the seat slide device 1 that is attached at the right side of the seat 2 in FIG. 1. Each the input gear 16e and the output gear 16f employs a screw gear configuration. In this screw gear configuration, each the input gear 16e and the output gear 16f is formed in a manner where its torsion angle is set to 45 degrees, and the input gear 16*e* and the output gear 16*f* are assembled in a manner where their shaft angle becomes 90 degrees.

In such configuration, the gear device 16*c* functions as a device that transmits one rotational movement relative to a rotation shaft extending in a right-rear direction of the vehicle seat to another rotational movement relative to a rotation shaft extending in a front-rear direction of the vehicle.

The screw member 13 is penetrated into the gear device 16*c* through a through hole 41*a* of the bracket 41, and the screw member 13 is engaged with the gear device 16*c* by means of a nut 13*e*, which is engaged with the screw member 13 at a front end thereof. The screw member 13 is connected to the output gear 16*f* of the gear device 16*c* at the serrated portion 13*a*. In this configuration, the rotation of the screw member 13 relative to the output gear 16*f* is regulated by the serrated portion 13*a*, and thus the screw member 13 rotates integrally with the output gear 16*f*.

The actuation of the seat slide device 1 will be explained. When the power is supplied to the motor 16*a* by the power supply unit, which is not shown, the driving force is generated at the motor 16*a*. The driving force generated at the motor 16*a* is transmitted to the screw member 13 via the decelerating portion 16*b* and the gear device 16*c* in order to rotate the screw member 13. Because the screw member 13 threadedly engages with the nut member 14 that is supported by the lower rail 11, when the screw member 13 is rotated, the screw member 13 moves in a front-rear direction of the vehicle relative to the nut member 14. Thus, the upper rail 12, which supports the screw member 13 by means of the bearing 17, slides in a front-rear direction of the vehicle relative to the lower rail 11, as a result, the position of the seat 2 relative to the floor 3 is adjusted in a front-rear direction of the vehicle.

While the upper rail 12 slides in a front-rear direction of the vehicle relative to lower rail 11, the screw member 13 and the bearing 17 supported by the upper rail 12 move relative to the covering member 15 fixed at the lower rail 11 in a front-rear direction of the covering member 15. As mentioned above, the opening portion 15*d* is provided at the covering member 15 so as to extend in a front-rear direction of the vehicle and open the space 15*c*, within which the screw member 13 is provided, in a lateral direction of the covering member 15.

The opening portion 15*d* faces the side wall 32 of the upper rail 12 that supports the bearing 17, and in this configuration, when the upper rail 12 slides relative to the lower rail 11 in a front-end direction of the seat 2, the bearing 17 supported by the side wall 32 of the upper rail 12 moves within the opening portion 15*d* of the covering member 15 in a front-end direction thereof. In other words, when the upper rail 12 slides relative to the lower rail 11 in a front-rear direction of the vehicle, because the bearing 17 supporting the screw member 13 does not engage with the covering member 15, even when the screw member 13 is positioned below the upper wall 15*a* of the covering member 15, the upper rail 12 slides relative to the lower rail 11 without any obstruction.

In this embodiment, the seat 2 slides relative to the floor 3 in a front-rear direction of the vehicle; however, the seat 2 may slide relative to the floor 3 in a right-left direction of the vehicle. In this case, the seat slide device 1 has a configuration in which the upper rail 12 slides relative to the lower rail 11 in a right-left direction of the vehicle.

Figure 6:
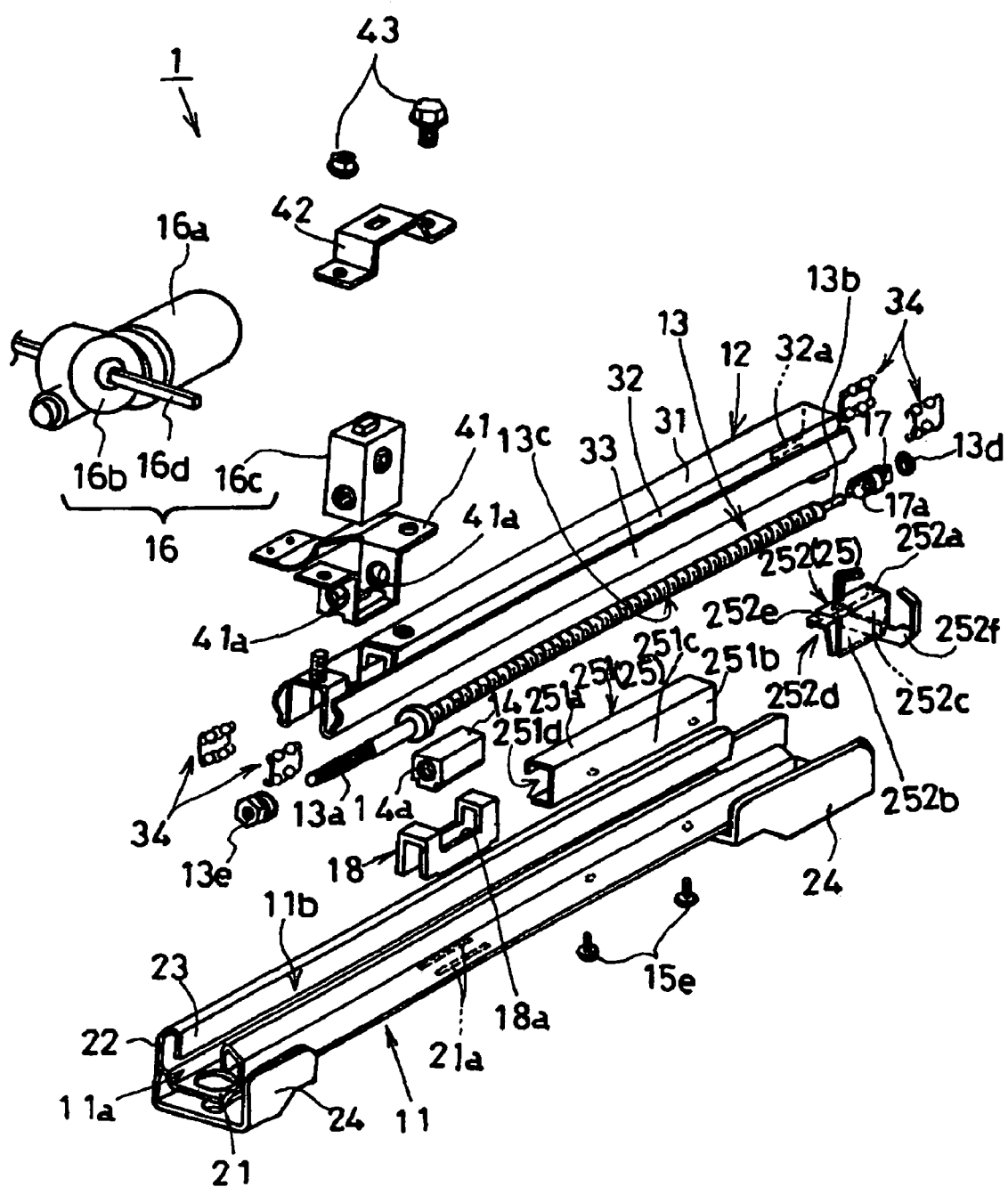
FIG. 6 illustrates a covering member according to a second embodiment (an exploded perspective view of the seat slide device according to the second embodiment)
Figure 7:
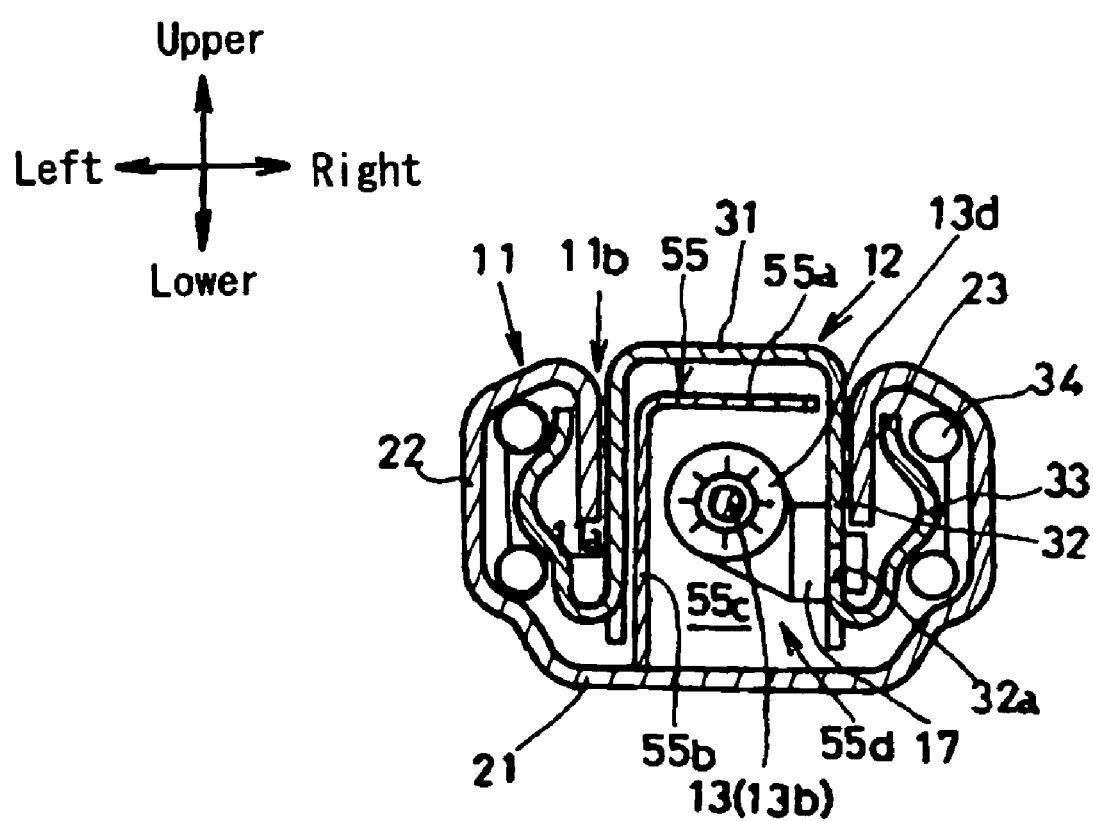
FIG. 7 illustrates a covering member according to a third embodiment (a diagram indicating the seat slide device of the third embodiment seen in VII direction).

Further, the covering member 15 may be configured as shown in FIGS. 6 and 7. Specifically, FIG. 6 indicates a second embodiment of the present invention, and FIG. 7 indicates a third embodiment of the present invention. The covering member 25 in the second embodiment shown in FIG. 6 is formed in a manner where the covering member 15 in the first embodiment is divided into two pieces so that a covering member 25 includes a first member 251 and a second member 252. Specifically, the first member 251 includes an approximately the same structure as that of the covering member 15 in the first embodiment.

More specifically, the first member 251 of the covering member 25 in the second embodiment includes an upper wall 251*a* covering the opening portion 11*b* of the lower rail 11, and a side wall 251*b* fixed at the bottom wall 21 of the lower rail 11 by means of the screws 15*e*. The length of the first member 251 in a front-rear direction thereof is set so as to be shorter than the length of the covering member 15 in the first embodiment in a front-rear direction thereof.

The second member 252 of the covering member 25 includes an upper wall 252*a* and a side wall 252*b*. The upper wall 252*a* is provided so as to cover the opening portion 11*b* of the lower rail 11. The second member 252 further includes a fitting portion 252*e* at the front end thereof and includes a covering portion 252*f* at the rear end thereof. The second member 252 is connected to the first member 251 in a manner where the fitting portion 252*e* of the second member 252 is fitted to the rear end of the first member 251, and the second member 252 is also connected to the lower rail in a manner where the covering portion 252*f* of the second member 252 is fitted to the rear end of the lower rail 11 so that the covering portion 252*f* functions as a cover for covering the rear end of the lower rail 11.

When the second member 252 is fitted to the first member 251, the upper wall 251*a* of the first member 251 continuously connects to the upper wall 252*a* of the second member 252, and the side wall 251*b* of the first member 251 continuously connects to the side wall 252*b* of the second member 252.

The covering member 25 further includes an opening portion 251*d* and an opening portion 252*d* (e.g., serving as a second opening portion when the second member is fitted to the first member). Specifically, the opening portion 251*d* is formed in order to open a space 251*c*, which is formed so as to be enclosed by the upper wall 251*a* and the side wall 251*b*, in a lateral direction of the covering member 25; and the opening portion 252*d* is formed in order to open a space 252*c*, which is formed so as to be enclosed by the upper wall 252*a* and the side wall 252*b*, in a lateral direction of the covering member 25.

Each of the opening portion 251*d* and the opening portion 252*d* is formed so as to extend in a front-rear direction of the vehicle. The screw member 13 is provided within the spaces 251*c* and 252*d* below the upper walls 251*a* and 252*a*. When the upper rail 12 slides relative to the lower rail 11 in a front-rear direction thereof, the bearing 17 supported by the side wall 32 of the upper rail 12 moves within the opening portion 251*d* and the opening portion 252*d* in a front-rear direction of the vehicle.

In this configuration, in case that the rear end of the covering member 25 could not be positioned identical to the rear end of the lower rail 11, for example, when a space needs to be provided at the rear end of the lower rail 11 in order to fix the lower rail 11 at the floor 3, because the covering member 25 of the second embodiment indicated in FIG. 6 is divided into the first member 251 and the second member 252, only the first member 252 is fixed to the lower rail 11 at first, and after the lower rail 11 if fixed on the floor 3, the second member 252 is fitted to the first member 251.

The first member 251 and the second member 252 can be made of different materials. For example, the first member 251 may be made of a metal material, and the second member 252 may be made of a resin material; or the second member 252 may be made of a metal material, and the first member 251 may be made of a resin material.

A covering member 55 shown in FIG. 7 extends in a front-rear direction of the vehicle and includes a Γ-shape. Specifically, the covering member 55 is made of a metal material or the like so as to include an upper wall 55a covering the opening portion 11b of the lower rail 11 and a side wall 55b fixed at the bottom wall 21 of the lower rail 11. The upper wall 55a and the side wall 55b are formed in a manner where the upper wall 55a continues from the side wall 55b. The covering member 55 is fixed on the bottom wall 21 of the lower rail 11 by welding or press fitting.

The covering member 55 further includes a space 55c formed so as to be enclosed by the upper wall 55a and the side wall 55b, and an opening portion 55d (second opening portion) opens the space 55c in a lateral direction of the covering member 55. The opening portion 55d extends in a front-rear direction of the vehicle.

The screw member 13 is provided within the space 55c below the upper wall 55a. When the upper rail 12 slides relative to the lower rail 11 in a front-rear direction of the vehicle, the bearing 17 supported by the side wall 32 of the upper rail 12 moves within the opening portion 55d in a front-rear direction of the vehicle.

Thus, according to the seat slide device 1 of the first embodiment, the screw member 13 is provided below the upper wall 15a of the covering member 15. In this configuration, because the screw member 13 is not provided between the upper wall 31 of the upper rail 12 and the upper wall 15a of the covering member 15, the upper wall 31 of the upper rail 12 is positioned closer to the upper wall 15a of the covering member 15. Thus, a distance between the upper wall 15a of the covering member 15 and the upper wall 31 of the upper rail 12 can be set to a smaller value, in other words a value of the height of the upper rail 12, can be set to a smaller value.

Thus, the seat 2 is positioned closer to the floor 3, as a result, more space can be provided within a vehicle interior in which the seat 2 is provided. In this configuration, a space above the head of the passenger on the seat 2 (a space between the passenger's head and a ceiling of the vehicle) can be increased, or the thickness of a seating surface of the seat 2 (the thickness of a seat cushion of the seat 2) can be increased in order to provide a more comfortable seat. In this way, according to the seat slide device 1, a design of the seat 2 can be more flexible.

According to the present invention, the screw member is positioned below the upper wall of the covering member. Thus, because the screw member is not positioned between the upper wall of the upper rail and the upper wall of the covering member, the upper wall of the upper rail can be positioned closer to the upper wall of the covering member. In this configuration, the distance between the upper wall of the covering member and the upper wall of the upper rail is set to a small value, in other words, the height of the upper rail, is set to a small value.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle seat slide device comprising:
   a lower rail formed so as to include a first opening portion opening upward and adapted to be fixed at a vehicle floor;
   an upper rail supported by the lower rail through the first opening portion of the lower rail so as to be slidable and supporting a vehicle seat;
   a screw member provided between the upper rail and the lower rail so as to extend in a sliding direction of the upper rail;
   a nut member fixed at the lower rail and threadedly engaged with the screw member;
   a covering member formed so as to include an upper wall covering the first opening portion and immovably fixed at the lower rail, the covering member having a rear end having an edge that is planarly aligned with a rear edge of a rear end of the lower rail;
   a driving mechanism generating a driving force by which the screw member is rotated relative to the nut member so that the upper rail slides relative to the lower rail; and
   the screw member positioned below the upper wall of the covering member.

2. The vehicle seat slide device according to claim 1 further includes a supporting member maintained by the upper rail in order to support the screw member so as to be rotatable, and a second opening portion provided at the covering member so as to extend in a sliding direction of the upper rail, wherein the supporting member is provided so as to be slidable within the second opening portion in a sliding direction of the upper rail.

3. The vehicle seat slide device according to claim 2, wherein the second opening portion is provided at the covering member so as to open in a lateral direction of the covering member.

4. The vehicle seat slide device according to claim 3, wherein the upper rail includes a vertical wall portion facing the second opening portion, and the supporting member is maintained by the vertical wall portion.

5. The vehicle seat slide device according to claim 1, wherein the lower rail is formed in a long-shape so as to have an approximate U-shaped cross section.

6. The vehicle seat slide device according to claim 1, wherein the upper rail is formed in a long-shape so as to have an approximate reversed U-shaped cross section.

7. The vehicle seat slide device according to claim 1, wherein the covering member is made of a metal material so as to include the upper wall covering the opening portion of the lower rail and the vertical wall fixed at the lower rail, and the upper wall and the vertical wall are formed in a manner where the upper wall continues from the vertical wall.

8. The vehicle seat slide device according to claim 1, wherein the covering member is comprised of two parts.

9. The vehicle seat slide device according to claim 1, wherein the covering member extends in a sliding direction of the upper rail and has an approximate C-shaped cross section.

10. The vehicle seat slide device according to claim 1, wherein the covering member extends in a sliding direction of the upper rail and has an approximate Γ-shaped cross section.

11. The vehicle seat slide device according to claim 1, wherein the upper rail moves relative to the covering member during sliding movement of the upper rail.

12. A vehicle seat slide device comprising:
   a lower rail configured to include a first opening portion opening upward and adapted to be fixed at a vehicle floor;

an upper rail supported by the lower rail through the first opening portion of the lower rail so as to be slidable and supporting a vehicle seat;

a screw member between the upper rail and the lower rail, and extending in a sliding direction of the upper rail;

a nut member fixed at the lower rail and threadedly engaged with the screw member;

a covering member comprising an upper wall covering the first opening portion, the covering member having a rear end having an edge that is planarly aligned with a rear edge of a rear end of the lower rail;

means for immovably fixing the covering member to the lower rail;

a driving mechanism generating a driving force by which the screw member is rotated relative to the nut member so that the upper rail slides relative to the lower rail; and wherein the screw member is positioned below the upper wall of the covering member.

13. The vehicle seat slide device according to claim 12, wherein the covering member possesses a rear end and the lower rail possesses a rear end, the rear end of the covering member and the rear end of the lower rail being identically positioned, and the upper rail moving relative to the covering member during sliding movement of the upper rail relative to the lower rail.

14. The vehicle seat slide device according to claim 12, wherein the covering member extends in the sliding direction of the upper rail and has an approximate C-shaped cross section.

15. The vehicle seat slide device according to claim 12, wherein the covering member extends in the sliding direction of the upper rail and has an approximate Γ-shaped cross section.

16. A vehicle seat slide device comprising:

a lower rail configured to include a first opening portion opening upward and adapted to be fixed at a vehicle floor;

an upper rail supported by the lower rail through the first opening portion of the lower rail so as to be slidable and supporting a vehicle seat;

a screw member between the upper rail and the lower rail, and extending in a sliding direction of the upper rail;

a nut member fixed at the lower rail and threadedly engaged with the screw member, the nut member having a rearward end;

a covering member comprising an upper wall covering the first opening portion and immovably fixed at the lower rail at a position such that a rearward end of the covering member is positioned rearwardly of the rearward end of the nut member, the covering member having a rear end having an edge that is planarly aligned with a rear edge of a rear end of the lower rail;

a driving mechanism generating a driving force by which the screw member is rotated relative to the nut member so that the upper rail slides relative to the lower rail; and wherein the screw member is positioned below the upper wall of the covering member.

17. The vehicle seat slide device according to claim 16, wherein the covering member possesses a rear end and the lower rail possesses a rear end, the rear end of the covering member and the rear end of the lower rail being identically positioned, and the upper rail moving relative to the covering member during sliding movement of the upper rail relative to the lower rail.

18. The vehicle seat slide device according to claim 16 wherein the covering member is comprised of two parts.

19. The vehicle seat slide device according to claim 16, wherein the covering member extends in the sliding direction of the upper rail and has an approximate C-shaped cross section.

20. The vehicle seat slide device according to claim 16, wherein the covering member extends in the sliding direction of the upper rail and has an approximate Γ-shaped cross section.

* * * * *